(12) United States Patent
Hemmett et al.

(10) Patent No.: US 7,844,418 B2
(45) Date of Patent: Nov. 30, 2010

(54) METHODS FOR DISTRIBUTING A RANDOM VARIABLE USING STATISTICALLY-CORRECT SPATIAL INTERPOLATION

(75) Inventors: Jeffrey G. Hemmett, Bolton Valley, VT (US); Mukesh Kumar, Fairfax, VT (US); Wayne H. Woods, Jr., Burlington, VT (US); Cole E. Zemke, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 12/030,462

(22) Filed: Feb. 13, 2008

(65) Prior Publication Data
US 2009/0204367 A1 Aug. 13, 2009

(51) Int. Cl.
*G06F 17/18* (2006.01)
*G21C 17/00* (2006.01)
(52) U.S. Cl. .......................... 702/179; 702/182; 716/6; 716/7
(58) Field of Classification Search .................. 702/179, 702/182; 716/7, 6
See application file for complete search history.

(56) References Cited
U.S. PATENT DOCUMENTS

| | | | | |
|---|---|---|---|---|
| 6,951,006 B1 * | 9/2005 | Teig et al. | | 716/12 |
| 6,957,409 B1 * | 10/2005 | Teig et al. | | 716/12 |
| 7,013,451 B1 * | 3/2006 | Teig et al. | | 716/13 |
| 7,020,863 B1 * | 3/2006 | Teig et al. | | 716/7 |
| 7,032,201 B1 * | 4/2006 | Teig et al. | | 716/7 |
| 7,280,939 B2 | 10/2007 | Hathaway et al. | | |
| 2006/0253820 A1 | 11/2006 | Bzowy | | |
| 2009/0144685 A1 * | 6/2009 | Jiang et al. | | 716/8 |

OTHER PUBLICATIONS

Carlen, et al. "Statistical Model for Spatial Correlation in Thin Film Deposition and Reactive Growth", IEEE Transactions on Semiconductor Manufacturing, vol. 11, No. 3, Aug. 1998, pp. 511-521.

* cited by examiner

*Primary Examiner*—Hal D Wachsman
*Assistant Examiner*—Janet L Suglo
(74) *Attorney, Agent, or Firm*—Wood, Herron & Evans, LLP

(57) ABSTRACT

Methods for distributing a random variable by spatial interpolation with statistical corrections. The method includes assigning a numerical value of the random variable at each vertex of an array of equilateral triangles formed in a planar coordinate frame and defining a plurality of test points at respective spatial locations in the planar coordinate frame that are bounded by the array of equilateral triangles. A numerical value of the random variable is distributed at each of the test points by spatial interpolation from one or more of the numerical values of the random variable assigned at each vertex of the array of equilateral triangles. The method further includes adjusting the numerical value of the random variable distributed at each of the test points with a respective correction factor.

8 Claims, 4 Drawing Sheets

METHODS FOR DISTRIBUTING A RANDOM VARIABLE USING STATISTICALLY-CORRECT SPATIAL INTERPOLATION

FIELD OF THE INVENTION

The invention relates generally to computerized modeling of integrated circuits and, in particular, to methods for distributing process variables by spatial interpolation for use in a circuit simulation tool.

BACKGROUND OF THE INVENTION

Electronic design automation (EDA) tools, such as circuit simulation tools, are routinely used to model integrated circuits. Effective circuit simulation tools permit a circuit designer to simulate the behavior of a complex design, identify any problems, and make alterations and enhancements to the integrated circuit before arriving at a final design. Circuit simulation tools formulate and solve the nonlinear algebraic differential equations associated with an integrated circuit design, as is known in the art. Accurate simulation modeling of on-chip process variables, such as film thicknesses, is essential to accurately model high-performance circuit behavior, such as timing, power consumption, functionality, and design yield.

Various different conventional statistical spatial correlation methods for process variables are available for use in circuit simulation tools. In bounding box methods, a box is drawn around the objects that may be correlated and, based upon some metric of the box (e.g., a diagonal), a nominal level of spatial correlation is assumed. Unfortunately, bounding box methods represent an experience-based, heuristic approach. In exact methods, a principal component analysis (PCA) is executed to exactly identify the spatial correlation for each set of objects for which spatial correlation information is desired. Unfortunately, exact methods are a relatively expensive approach that is rarely implemented in practical tools.

Rectangular grid methods, which represent the prevalent approach for statistical spatial correlation, employ a fixed rectangular grid smaller than the spatial correlation distance. A single PCA is performed and applied to all sets of objects being considered, as a function of which grid cell they occupy. The rectangular grid approach assumes that the spatial correlation is constant within each grid, which allows the spatial correlation to be considered by defining the contents of each grid element to be a linear combination of the raw statistical data in the surrounding grids. Although conceptually similar to the rectangular grid approach, the hexagonal grid approach may be more computationally accurate given the higher packing density and lowered directional dependence of hexagonal grid cells in comparison with rectangular grid cells.

None of these conventional approaches is capable of continuously distributing the process variables across a chip, which denotes a significant deficiency. In rectangular and hexagonal grid approaches, discontinuities occur across grid boundaries. Devices bounded within each of the individual grid regions behave identically. However, devices bounded in adjacent grid regions behave differently regardless of the spacing between these devices, which leads to a mismatch in behavior. Generally, conventional approaches fail to maintain the local spatial correlation and, more often than not, are computationally inefficient.

Consequently, improved methods are needed for distributing process variables for use in circuit simulation tools that overcome these and other deficiencies of conventional approaches of distributing process variables.

SUMMARY OF THE INVENTION

In one embodiment, a method is provided for distributing a process variable using statistically-correct spatial interpolation. The method includes forming an array of equilateral triangles in a planar coordinate frame, assigning a numerical value of the random variable at each vertex of the array of equilateral triangles, and defining a plurality of test points at respective spatial locations in the planar coordinate frame that are bounded by the array of equilateral triangles. A numerical value of the random variable is distributed at each of the test points by spatial interpolation from one or more of the numerical values of the random variable assigned at each vertex of the array of equilateral triangles. The method further includes adjusting the numerical value of the random variable distributed at each of the test points with a respective correction factor.

DETAILED DESCRIPTION

In accordance with embodiments of the invention, a process variable is randomly sampled from a global distribution and distributed across a chip at equally-spaced test points separated a maximum spatial correlation distance. A statistically-correct interpolation is used to compute the value of the process variable at any position on the chip. The algorithm, which is computationally efficient, can be implemented practically into the languages of conventional circuit simulation tools. Among the benefits of the embodiments of the invention is that process variables are continuously distributed across a chip in a computationally efficient manner. Global statistical distribution and local spatial correlation are maintained by the distribution process and the statistically-correct interpolation.

Figure 1:
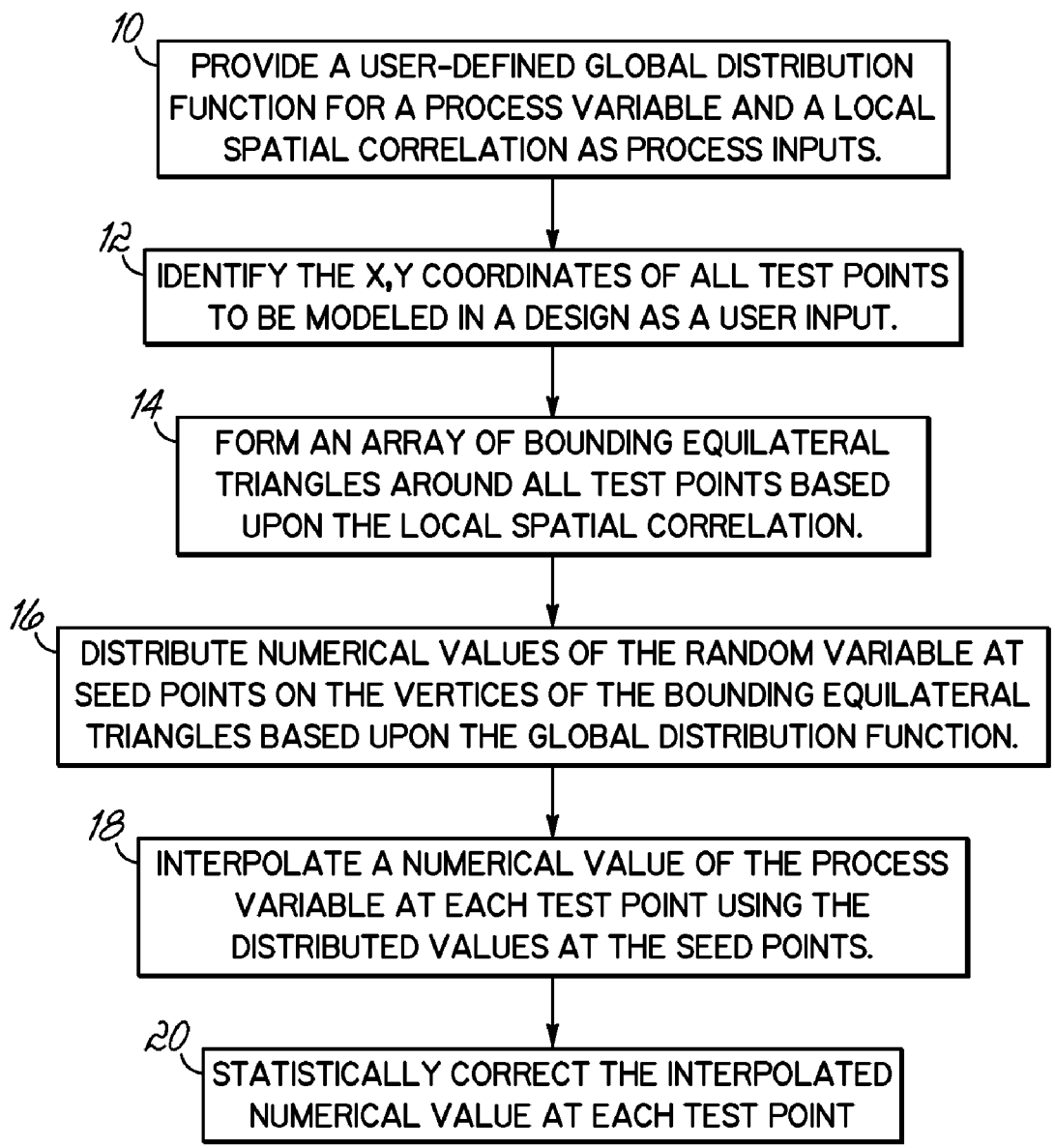
FIG. 1 is a flow chart of a method for continuously distributing a process variable using statistically-correct spatial interpolation in accordance with an embodiment of the invention.
Figure 2:
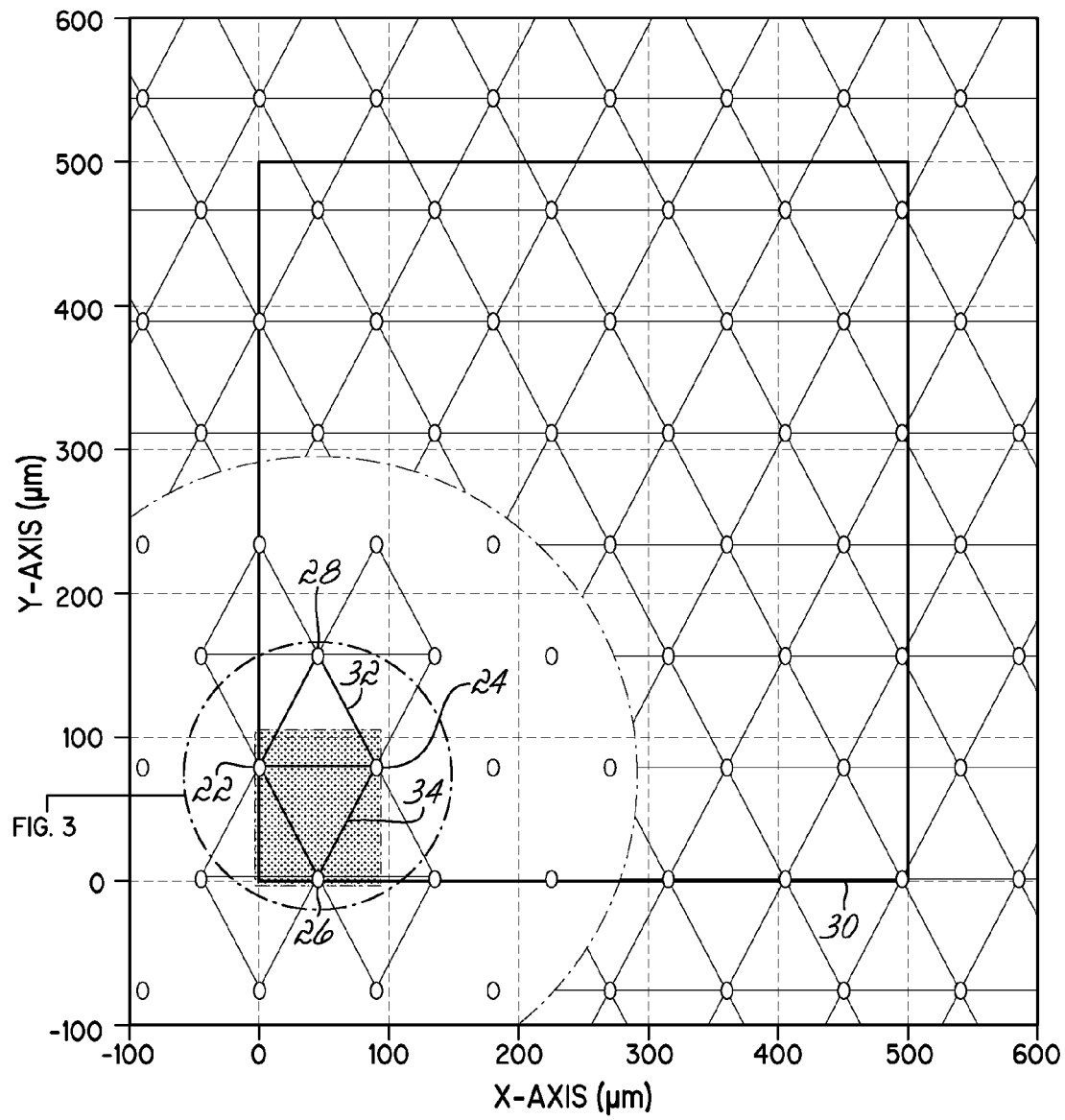
FIG. 2 is a diagrammatic view depicting an array of bounding equilateral triangles formed around the test points for the interpolation in accordance with an embodiment of the invention.

With reference to FIG. 1 and in accordance with an embodiment of the invention, a user defines a global distribution function and a local spatial correlation in block 10 as process inputs for use in distributing a process variable. The user-defined global distribution function contains information relating to various measurements of the process variable made on a chip region 30 (FIG. 2). The global distribution function may be a Gaussian or normal distribution, although the invention is not so limited. For example, a Gaussian distribution with a mean of unity and a standard deviation (i.e., sigma) of 0.2 may be used as the global distribution function for the process variable. The global distribution function may be determined with the assistance of a data analysis software application like MATLAB® commercially available from The MathWorks, Inc. (Natick, Mass.).

Correlation is the degree to which two or more quantities are linearly associated. The local spatial correlation supplies the minimum distance, $d_0$, between adjacent spatial locations for which the process variable is spatially correlated. Spatial locations in the global distribution function that are near each other are more likely to have more similar characteristics than those placed far away, which is reflected in the local spatial correlation. For separations between spatial locations exceeding the minimum distance, $d_0$, values of the random process variable are no longer spatially correlated and, instead, are assumed to be statistically independent.

In general, the value of the process variable at each spatial location is distributed within a range bounded between a minimum value and a maximum value. The process variable may be, for example, a height or thickness of the metallization for the M1-level wiring of a multi-level interconnect for the integrated circuit. As a numerical example, an ideal targeted thickness of, for example, 35 nanometers (nm) may be specified in the circuit design for the metallization thickness for the M1-level wiring as a across the entire chip. However, at different spatial locations within the chip region 30, the actual metallization thickness may vary away from the targeted thickness. For example, the actual metallization thickness may range from a minimum value of 32 nm to a maximum value of 40 nm at different spatial locations within the chip region 30.

For purposes of description, the term "chip" is considered herein to be synonymous with, and is used interchangeably with, the terms "integrated circuit" and "die".

In block 12, an array of test points 25 are identified in a chip region 30 where a process variable is to be distributed. For example, an array of 400 test points of different spatial locations within the chip region 30 may be specified by the user. The test points 25, which are input by the user, are positioned at regular, equally-spaced locations in a planar (x-y) coordinate frame in which one corner of the chip region 30 is located at the origin of the coordinate frame and the edges of the chip region 30 coincide with the ordinate and abscissa of the planar coordinate frame.

Figure 3:
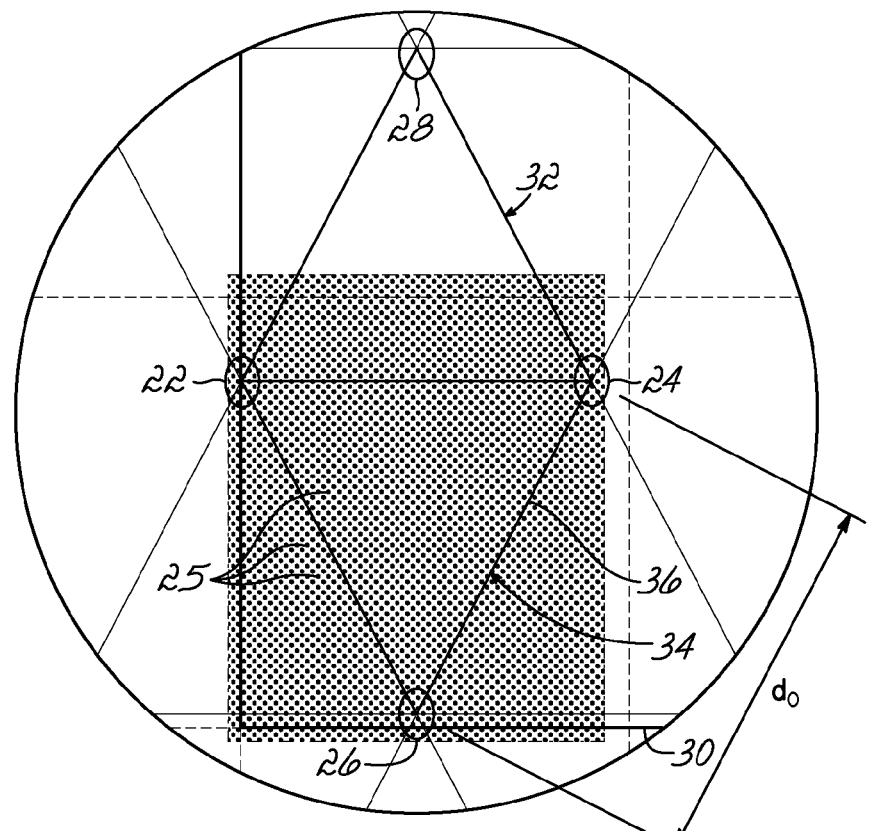
FIG. 3 is an enlarged view of a portion of FIG. 2.

In block 14, a plurality of seed points, such as the representative seed points 22, 24, 26, 28, for the process variable to be modeled in the chip design are identified in the chip region 30. As best shown in FIG. 3, adjacent pairs of seed points, including the representative seed points 22, 24, 26, 28, are spatially separated from each other in the x-y plane by a minimum distance, $d_0$, where the local spatial correlation equals zero. An array of bounding equilateral triangles is constructed with edges or sides, such as side 36 of the representative equilateral triangle 34, that connect the seed points, such as the representative equilateral triangles 32, 34 having sides that connect seed points 22, 24, 26, 28. The array of equilateral triangles is a physically correct configuration for the randomly-sampled seed points of the process variable. Because of the arrangement of the seed points, the sides of the equilateral triangles, such as side 36 of representative equilateral triangle 34, have a length equal to the minimum distance, $d_0$, at which the local spatial correlation equals zero. As a result, the grid size for the process variable distribution is equal to minimum distance, $d_0$. Moreover, because of the arrangement of the seed points, a triangle vertex is defined at the spatial location of each seed point in the planar coordinate frame. The equilateral triangles bound the spatial locations of the test points identified in block 12.

Figure 4A:
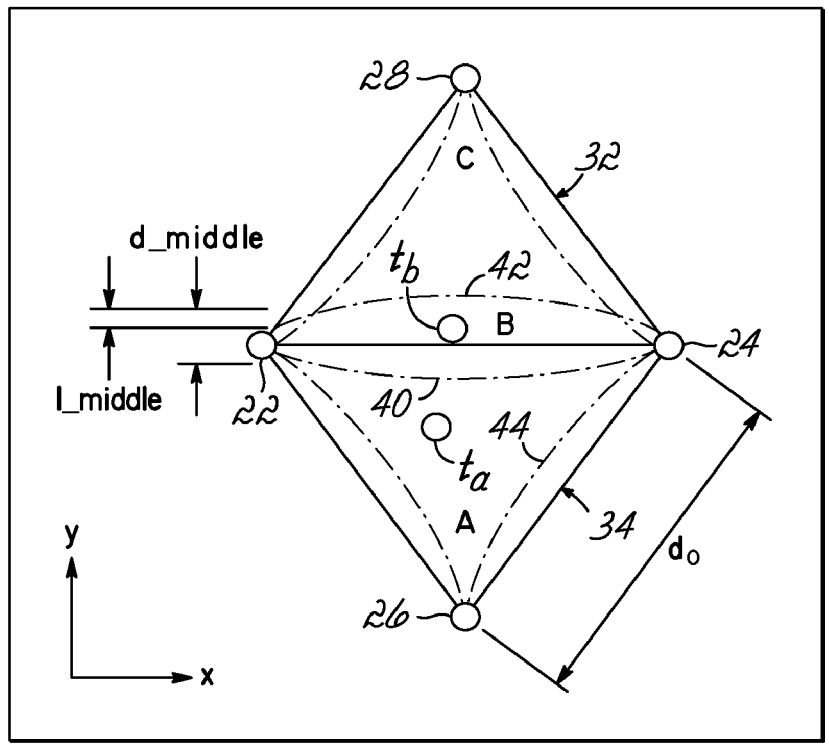
FIG. 4A is a diagrammatic view of one of the equilateral triangles of FIG. 3 in which the value for the process variable for two representative test points has been determined by a Monte Carlo simulation.
Figure 4B:
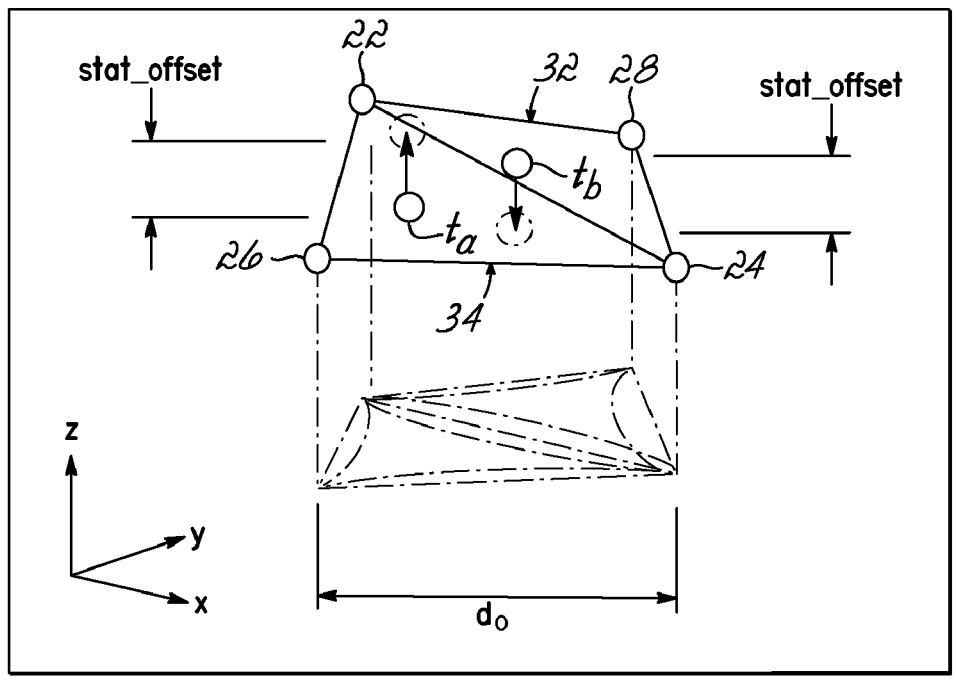
FIG. 4B is a diagrammatic view illustrating the statistical correction process for the two representative test points in FIG. 4A.

In block 16, the random process variable is distributed from the global distribution on the seed points in the array of equilateral triangles. The process variable distribution is accomplished by assigning a numerical value of the process variable computed from the global distribution at each of the seed points, which have definite spatial locations in the plane containing the array of bounding equilateral triangles. For example, as shown in FIGS. 4A and 4B, a numerical value of the process variable for each of the representative seed points 22, 24, 26, 28 of the equilateral triangles 32, 34 is picked from the global distribution function. The z-coordinate at each of the seed points 22, 24, 26, 28 is set equal to the numerical value of the process variable derived from the global distribution function.

In block 18, a spatial interpolation method is used to interpolate a numerical value of the process variable at the spatial location of the test points 25 identified in block 12. The spatial interpolation method may be implemented using a circuit simulator, such as HSPICE commercially available from Synopsys, Inc. (San Jose, Calif.) or SPECTRE commercially available from Cadence Design Systems, Inc. (San Jose, Calif.). A variety of different interpolation algorithms may be employed to interpolate the numerical value of the process variable at the spatial location of each individual test point 25, as understood by a person having ordinary skill in the art.

In block 20, the interpolated numerical value of the process variable at the spatial location of each test point is statistically corrected to account for deviations in the distribution at each test point location from the desired global distribution introduced by the spatial interpolation method. The statistical correction adjusts the interpolated numerical value for the process variable at each test point such that the distribution of all interpolated numerical values conforms more closely with the original global distribution function specified as a process input in block 10.

In one embodiment, the statistical correction procedure involves mathematically adding a correction factor in the form of an offset to every interpolated numerical value of the process variable derived from the Monte Carlo simulation. The correction with the offset forces the standard deviation and spatial correlation factor of the interpolated numerical values to more closely match the standard deviation and spatial correlation factor of the user-defined global distribution function constituting one of the process inputs in block 10 (FIG. 1). In the absence of the correction factor, the standard deviation of the calculated values may be significantly smaller than the standard deviation of the global distribution function.

The offsets forming the correction factor are continuous across the different equilateral triangles. The global distribution function is preserved on each iteration or run in a Monte Carlo runset, as well as for the accumulated results from different Monte Carlo runsets. The spatial correlation is user-controlled.

EXAMPLE 1

For purposes of Monte Carlo simulation, the footprint of the representative triangles 32, 34 was divided into three distinct regions and the test points 25 (FIG. 3) were distributed among the three regions according to their spatial location. Certain test points 25 were positioned in planar interpolation regions, which are labeled on FIG. 4A as region "A" inside representative triangle 32 and region "C" inside representative triangle 34. Other test points 25 were positioned in a region "B" located between Regions A and C. Region B represents a curved surface bounded between the two circular arcs 40, 42 in the x-y plane swept about the origins of seed points 26 and 28. Each of the circular arcs 40, 42 has a radius equal to the minimum distance, $d_0$.

A representative test point, $t_a$, from among test points 25 is located in Region A within the minimum distance, $d_0$, from each of the seed points 22, 24, 26. Another representative test point, $t_b$, from among test points 25 is located in Region B. Representative test point, $t_b$, is distanced within the minimum distance, $d_0$, from each of the seed points 22, 24, 26, 28. Arcs bordering the edges of the equilateral triangle, such as arc 44, indicate where the distance between neighboring pairs of seed points 22, 24, 26, 28 equals $d_0$.

For the representative test point, $t_a$, in Region A, the value of the process variable (z_test) is interpolated onto a plane intersecting the seed points 22, 24, 26. Seed point 22 is assigned coordinates (x2,y2,z2), seed point 24 is assigned coordinates (x3,y3,z3), seed point 26 is assigned coordinates (x4,y4,z4), and representative test point, $t_a$, is assigned coordinates (x_test, y_test). The value of the process variable (z_test) distributed by spatial interpolation at the representative test point, $t_a$, in the planar-interpolation Region A is computed as follows:

alpha=(x2−x1)/(x3−x4)

gamma=(y1−y2)/(x2−x4)

omega=1/(x2−x4)

a=(x4−x_test)

b=(y4−y_test)

beta=(y3−y4)*(x2−x4)/(x3−x4)−(y2−y4)

AA=a*omega−(a*gamma+b)/beta+(alpha/beta)*(a*gamma+b)+1

BB=(a*gamma+b)/beta−a*omega

CC=−(alpha/beta)*(a*gamma+b)

z_test=AA*z4+BB*z2+CC*z3

A numerical value for the process variable at additional test points of the array in Region A, as well as those test points of the array in Region C, are spatially interpolated in a similar manner to the procedure for spatially interpolating the value of the process variable for distribution at the representative test point, $t_a$.

For the representative test point, $t_b$, in Region B, the value of the process variable (z_test) is distributed by spatial interpolation onto the curved surface between the arcs. Representative seed point 28 is assigned coordinates (x1,y1,z1) and the representative test point, $t_b$, is assigned the spatial coordinates (x_test, y_test). The value of the process variable at test point, $t_b$, within Region B is specified as a mathematical combination of the values of the process variable calculated for the planar-interpolation regions (Regions A and C).

Within the planar interpolation region of seed points 22, 24, 28 (Region C), the following equations are solved:

alpha=(x2−x3)/(x1−x3)

gamma=(y3−y2)/(x2−x3)

omega=1/(x2−x3)

a=(x3−x_test)

b=(y3−y_test)

beta=(y1−y3)*(x2−x3)/(x1−x3)−(y2−y3)

AA_a=a*omega−(a*gamma+b)/beta+(alpha/beta)*(a*gamma+b)+1

BB_a=(a*gamma+b)/beta−a*omega

CC_a=−(alpha/beta)*(a*gamma+b)

Within the planar interpolation of seed points 22, 24, 26 (Region A), the following equations are solved:

alpha=(x2−x3)/(x4−x3)

gamma=(y3−y2)/(x2−x3)

omega=1/(x2−x1)

a=(x3−x_test)

b=(y3−y_test)

beta=(y4−y3)*(x2−x3)/(x4−x3)−(y2−y3)

AA_b=a*omega−(a*gamma+b)/beta+(alpha/beta)*(a*gamma+b)+1

BB_b=(a*gamma+b)/beta−a*omega

CC_b=−(alpha/beta)*(a*gamma+b)

The results from the planar interpolation in Region A and the planar interpolation in Region C are smoothly joined across Region B to determine a value of the process variable for test point, $t_b$, by a mathematical combination given by:

z_test=(ka*AA_a+kb*AA_b)*z1+(ka*BB_a+kb*BB_b)*z2+ka*CC_a*z3+kb*CC_b*z4, wherein a ratio of the location of test point, $t_b$, within Region B is given by:

ka=(d_middle−l_middle)/d_middle kb=l_middle/d_middle

A numerical value for the process variable distributed at additional test points of the array in Region B are spatially interpolated in a similar manner to the procedure for spatially interpolating the value of the process variable for distribution at the representative test point, $t_b$.

The statistical offset (stat_offset) added to each calculated value for each of the interpolated test points in the chip region 30, including the representative test points $t_a$ and $t_b$, is given by the product of two multiplicative factors. The first multiplicative factor (stat_add) is a random numerical value chosen from original global distribution function with the mean set equal to zero (i.e., value in the original global distribution function minus the mean). The second multiplicative factor (f_c_test) used in the determination of the offset is computed contingent upon the specific interpolation method used to determine the calculated value of the process variable.

In an exemplary embodiment, the value of the process variable at each of the seed points 22, 24, 26, 28, which are represented by the z-coordinates (z1, z2, z3, and z4), are assumed to have the same standard deviation and variance.

For planar interpolation regions like Regions A and C, the second multiplicative factor (f_c_test) is given by:

$$f\_c\_test = (1-((AA)^2+(BB)^2+(CC)^2))^{1/2}$$

The statistical offset (stat_offset) is given by:

$$stat\_offset = stat\_add * f\_c\_test.$$

In intermediate curved-surface interpolation regions like Region B, the second multiplicative factor (f_c_test) is determined from a position dependent mathematical combination of the second multiplicative factor values in regions A and C given by:

$$f\_c\_test = (1/(ka*ka+kb*kb)^{1/2})*(1-((ka*AA\_a+kb*AA\_b)^2+(ka*BB\_a+kb*BB\_b)^2+(ka*CC\_a)^2+(kb*CC\_b)^2))^{1/2}$$

The statistical offset (stat_offset) for test point, $t_b$, is given by:

$$stat\_offset = (stat\_add\_a*ka+stat\_add\_b*kb)*f\_c\_test$$

A numerical value of the process variable was interpolated for a plurality of test points within the chip region 30 using a local spatial correlation and a Gaussian global distribution function as process inputs. The mean of the Gaussian global distribution function was set at 1.0059 and the standard deviation was chosen to be 0.19735. The minimum distance, $d_0$, where the local spatial correlation approaches zero, was chosen to be 90 microns (μm).

After 1000 Monte Carlo iterations, the interpolated values of the process variable at the test points exhibited a mean of 1.0094 and a standard deviation of 0.14457. After executing a statistical correction as outlined above, the statistically-correct interpolated values of the process variable at the test points exhibited a mean of 1.0087 and a standard deviation of 0.19773. The conclusion is that the statistical correction procedure causes the mean and standard deviation of the interpolated values of the process variable to more closely approximate the mean and standard deviation of the global distribution function.

Figure 5:
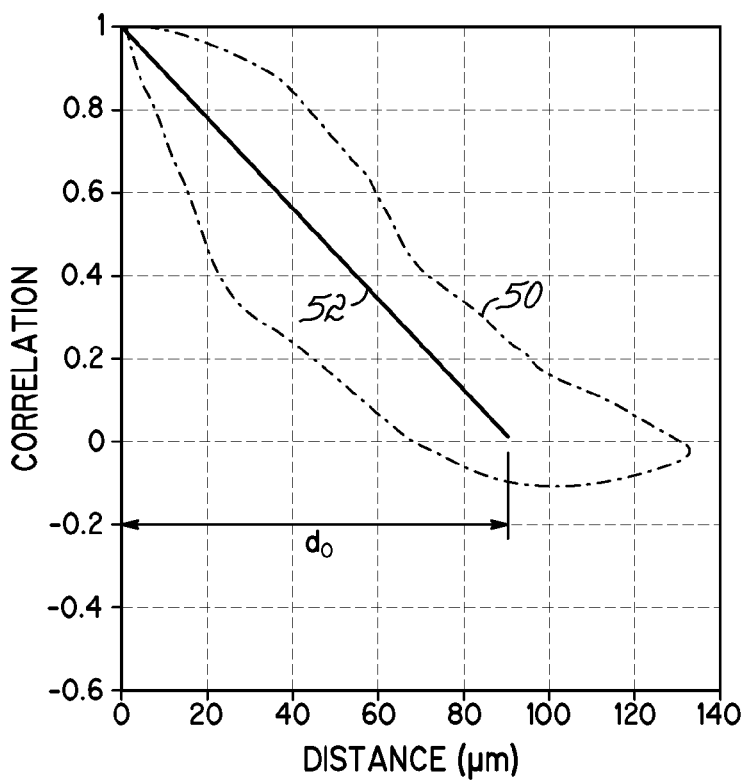
FIG. 5 is a diagrammatic graphical view depicting the spatial correlation for the statistically-correct interpolated values of the process variable in comparison with the process inputs.

In FIG. 5, the local spatial correlation for the statistically-correct interpolated values of the process variable is plotted as a function of separation distance between test points in the x-y plane (FIGS. 2, 3, 4A, 4B) for the 1000 Monte Carlo iterations. An envelope 50 is defined that bounds the scatter plot of the correlation coefficient from the different Monte Carlo iterations. Line 52 represents the global distribution function input into the interpolation process, which approaches zero at the minimum distance for the local spatial correlation. As apparent from the symmetry of the envelope 50 about line 52, the local spatial correlation of the process variable resulting from the statistically-correct interpolation approximates the local spatial correlation of the global distribution function used as a process input.

In alternative embodiments of the invention, the local spatial correlation does not have to extend from unity to zero, as shown in FIG. 5. For example, the local spatial correlation may begin at a numerical value less than unity to represent truly random variations. As another example, the local spatial correlation can end above zero to represent global process variations.

The statistically-correct interpolation techniques are described herein in the context of the design of on-chip circuitry and variations of process parameters or variables inside a single die (i.e., intra-die variations). However, the statistically-correct interpolation techniques may find wider applicability in any technological field that requires correct spatial correlation of a random parameter or variable.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method for distributing a process variable using statistically-correct spatial interpolation, the method comprising:

configuring a circuit simulation tool to perform computerized modeling of a chip to be fabricated using the process variable in a process step;

forming, using the circuit simulation tool, an array of equilateral triangles in a planar coordinate frame on a region of the chip;

assigning, using the circuit simulation tool, a numerical value of the process variable at each vertex of the array of equilateral triangles;

defining, using the circuit simulation tool, a plurality of test points at respective spatial locations in the planar coordinate frame that are bounded by the array of equilateral triangles;

distributing, using the circuit simulation tool, a numerical value of the process variable at each of the test points by spatial interpolation from one or more of the numerical values of the process variable assigned at each vertex of the array of equilateral triangles; and adjusting, using the circuit simulation tool, the numerical value of the process variable distributed at each of the test points with a respective correction factor.

2. The method of claim 1 wherein forming, using the circuit simulation tool, the array of equilateral triangles further comprises:

defining, using the circuit simulation tool, a local spatial correlation that equals zero at a minimum distance between test points; and assigning, using the circuit simulation tool, a length to each side of the equilateral triangles to be equal to the minimum distance for the local spatial correlation.

3. The method of claim 1 wherein assigning, using the circuit simulation tool, the numerical value of the process variable at each vertex of the equilateral triangles further comprises:

providing, using the circuit simulation tool, a global distribution function for the process variable; and specifying, using the circuit simulation tool, the numerical value at each vertex from the global distribution function.

4. The method of claim 3 wherein the global distribution function has an associated standard deviation, and each respective correction factor is selected to reduce a difference between a local standard deviation of the numerical values of the process variable at the test points and the standard deviation of the global distribution function.

5. The method of claim 1 wherein the numerical value at each vertex of the array of equilateral triangles is assigned from a global distribution function having a mean, and further comprising:

randomly selecting, using the circuit simulation tool, a numerical value of the process variable chosen from the global distribution function with the mean set equal to zero;

determining, using the circuit simulation tool, a respective multiplicative factor based upon the spatial location of each of the test points relative to respective spatial locations in the planar coordinate frame for one or more of the vertices of the array of equilateral triangles; and multiplying, using the circuit simulation tool, the respective multiplicative factor and the randomly selected numerical value of the process variable to determine the respective correction factor used to adjust the numerical value of the process variable distributed at each of the test points.

6. The method of claim 1 further comprising:

calculating, using the circuit simulation tool, the correction factor for the numerical value of the process variable at each of the test points with a mathematical algorithm.

7. The method of claim 1 wherein adjusting, using the circuit simulation tool, the numerical value of the process variable at each of the test points with the respective correction factor further comprises:

adding, using the circuit simulation tool, a numerical offset as the respective correction factor to the numerical value of the process variable distributed by the spatial interpolation at each of the test points.

8. The method of claim 1 wherein the process variable is a height or a thickness for metallization in a wiring level of a multi-level interconnect of the chip.

* * * * *